United States Patent [19]

Hinz et al.

[11] Patent Number: 4,466,399

[45] Date of Patent: Aug. 21, 1984

[54] PISTON-CYLINDER SET FOR RECIPROCATING INTERNAL-COMBUSTION ENGINES, ESPECIALLY OTTO AND DIESEL ENGINES

[75] Inventors: Bernhard Hinz, Frankfurt; Richard Kochendörfer, Stuttgart, both of Fed. Rep. of Germany

[73] Assignee: Deutsche Forschungs- und Versuchsanstalt für Luft- und Raumfahrt e.V., Fed. Rep. of Germany

[21] Appl. No.: 411,461

[22] Filed: Aug. 25, 1982

[30] Foreign Application Priority Data

Sep. 2, 1981 [DE] Fed. Rep. of Germany ....... 3134768

[51] Int. Cl.³ .............................................. F02F 3/04
[52] U.S. Cl. .......................... 123/193 CP; 123/193 R; 123/193 P; 123/668; 92/169; 92/144; 92/212
[58] Field of Search ......... 123/193 R, 193 CP, 193 P, 123/668, 41.83; 92/169, 144, 212, 222

[56] References Cited

FOREIGN PATENT DOCUMENTS

| | | |
|---|---|---|
| 266480 | 10/1913 | Fed. Rep. of Germany . |
| 733038 | 3/1943 | Fed. Rep. of Germany . |
| 1761116 | 2/1951 | Fed. Rep. of Germany . |
| 1174110 | 7/1964 | Fed. Rep. of Germany . |
| 2010501 | 3/1969 | Fed. Rep. of Germany . |
| 2737596 | 3/1978 | Fed. Rep. of Germany . |
| 3029163 | 2/1981 | Fed. Rep. of Germany . |
| 2938018 | 4/1981 | Fed. Rep. of Germany . |

OTHER PUBLICATIONS

Weitere Nichteisenwerkstoffe für Kolben?; Hans Köhnert; pp. 31-37.

*Primary Examiner*—Craig R. Feinberg
*Assistant Examiner*—David A. Okonsky
*Attorney, Agent, or Firm*—Kenway & Jenney

[57] ABSTRACT

To avoid the necessity of piston rings in a piston-cylinder set, it is proposed that the cylinder liner be surrounded by a band consisting of a fiber composite whose thermal expansion in a radial direction is less than that of the cylinder liner, the impediment to expansion presented by the band varying over the length of the cylinder housing; that the piston be constructed with a cap consisting of a piston head facing the combustion chamber and an essentially cylindrical piston skirt adjacent to the cylinder bearing surface, and a force-transmitting core that contains the bearing for the piston pin and the spherical pressure pad; that a force-transmitting connection rotationally symmetrical to the piston's longitudinal axis be provided above the spherical pressure pad; that the cap be connected at the lower edge of the piston skirt to the force-transmitting core, but otherwise no contact be provided between cap and force-transmitting core except in the area of the force-transmitting connection; and that both cylinder liner and cap be fabricated from ceramic material.

8 Claims, 1 Drawing Figure

U.S. Patent   Aug. 21, 1984   4,466,399
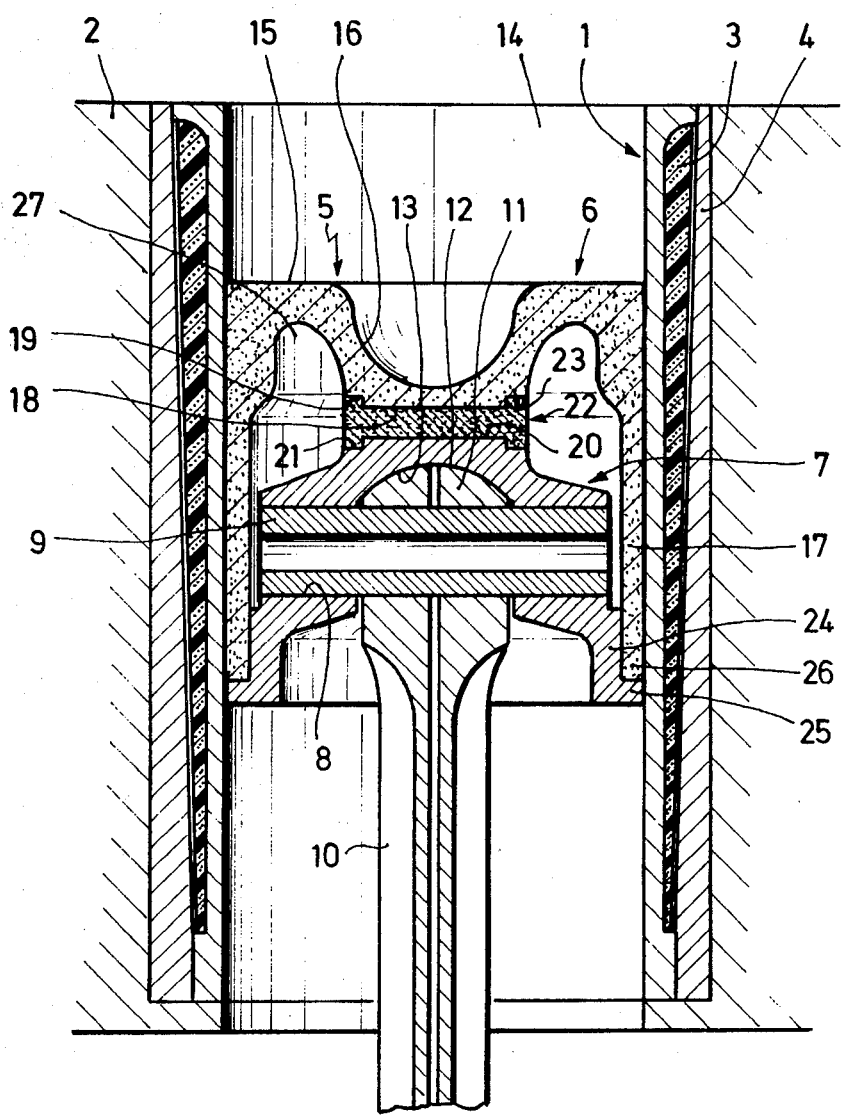

PISTON-CYLINDER SET FOR RECIPROCATING INTERNAL-COMBUSTION ENGINES, ESPECIALLY OTTO AND DIESEL ENGINES

The invention concerns a piston-cylinder set for reciprocating internal-combustion engines, especially Otto and diesel engines, with a cylinder liner and a piston supported movably therein that contains a rotary connecting-rod bearing employing a piston pin held within the piston and a spherical pressure pad in the piston that makes two-dimensional contact with a corresponding spherical pressure pad on the connecting rod.

Such a design is known, e.g., from German Disclosure No. 27 37 596.

A large portion of the heat delivered to a reciprocating internal-combustion engine by its fuel is wasted, since it must be removed by coolant. All told, the portion of thermal energy conducted away by coolant in conventional reciprocating internal-combustion engines is 25–35% of the heat supplied by their fuel. By far the predominant transmission of heat to coolant occurs at the walls of the combustion chamber, especially at the cylinder liner. Cooling of the cylinder liner is necessary in conventional reciprocating internal-combustion engines because otherwise the thermal stress on cylinder liner and piston would be too high. Cooling is also particularly necessary to avoid carbonization of lubricant in the area of the piston rings, since such carbonization would result in reduction in their sealing action and damage to the piston rings. This necessity limits the maximum temperature in the area of the piston-cylinder set that comes into contact with the piston-ring lubricant to ca. 220°–230° C.

In addition to direct heat loss through cooling, other losses occur from driving the coolant circuit required for cooling.

The necessity for the piston rings to achieve a perfect seal between piston and cylinder bearing surface also results in stress concentrations in the cylinder due to the piston ring grooves required. These prove to be mechanically weak points in the cylinder, so damage can occur here, especially when brittle materials are used.

It is already known for certain measures to be taken to reduce heat losses from the combustion chamber. These include the use of pistons with ceramic piston heads, and the use of pistons with separate heads and skirts (Elsbett, Development of a Diesel Motor with Heat-retaining Combustion Chamber, MTZ 42-1981-3). The use of ceramic materials in piston and cylinder lining is also known in itself (Ceramics Eliminate Diesel Cooling, Automot. Ind. 160-1980-6).

However, none of these measures eliminates the necessity of sealing the pistons in relation to their cylinder liners with piston rings, so the requirement for low temperatures in the sealing area must be maintained.

In contrast, the application subject is based on the problem of proposing a piston-cylinder set which, as a unit, will withstand high thermal stress.

This problem is solved according to the invention with a piston-cylinder set of the type described at the beginning by enclosing the cylinder liner within a band consisting of fiber composite whose thermal expansion in a radial direction is less than that of the cylinder liner, the impediment to expansion presented by the band varying over the length of the cylinder liner; constructing the piston with a cap consisting of a piston head facing the combustion chamber and an essentially cylindrical piston skirt adjacent to the cylinder bearing surface, and a force-transmitting core that contains the bearing for the piston pin and the spherical pressure pad; providing above the spherical pressure pad a force-transmitting connection between piston head and force-transmitting core that is rotationally symmetrical to the piston's longitudinal axis; connecting the cap at the lower edge of the piston skirt to the force-transmitting core, but otherwise providing no contact between cap and force-transmitting core except in the area of the force-transmitting connection; and fabricating both cylinder liner and cap from ceramic material.

This arrangement makes possible the maintenance of a perfect seal between piston and cylinder liner, even at the high temperatures encountered in operation, so that the necessity for piston rings is avoided.

This is achieved by a series of individual measures that mutually complement each other so advantageously that, taken together, the desired sealing properties are obtainable.

As a result of the band surrounding the cylinder liner, the radial expansion of the latter is influenced by increasing temperature such that the cylinder liner undergoes radial thermal expansion matching that of the piston, which, moreover, is essentially constant over the entire length of the cylinder liner and independent of the temperature gradient that arises longitudinally in the cylinder liner during operation. Toward this end the band impedes radial expansion of the liner in varying degree over the length of the latter. In the upper, hot region its radial expansion is impeded to a greater extent than in its lower, cooler region, so that as a unit its radial expansion is rendered uniform. In addition, as a result of appropriate compressive prestressing of the ceramic cylinder liner, the band accommodates the forces that arise due to combustion pressure. Tensile stress on the cylinder liner is therefore avoided.

This can be accomplished by varying the thickness or the construction of the band, e.g., different fibers may be used in the fiber composite band in its upper and lower regions, or the orientation of fibers may be varied in different regions of the band.

At the same time, the construction of the piston in the invention ensures that the parts of the piston lying in close contact with the bearing surface exhibit a rotationally symmetrical temperature distribution, and that forces are transmitted to these parts in a rotationally symmetrical manner. As a result, deformation of the piston section contacting the bearing surface of the cylinder liner also remains rotationally symmetrical, despite the impossibility of making certain parts of the piston rotationally symmetrical due to the linkage of the connecting rod to the piston. Within the framework of the invention this is achieved by dividing the piston into two basic components: the rotationally symmetrical cap exposed to the hot combustion gases, and the nonrotationally-symmetrical force-transmitting core, which is connected to the cap only by means of rotationally symmetrical parts and is not impinged upon by the hot combustion gases. In this way the combustion pressure is conveyed to the force-transmitting core with rotational symmetry by central force transmission. The cap is connected only along its lower, circular-cylindrical edge to an appropriately designed section of the force-transmitting core, so that, in this way as well, asymmetrical deformation of the piston skirt is avoided.

Rotationally asymmetrical thermal expansion of the force-transmitting core can therefore have no effect on the cap, and on the other hand the force-transmitting core is efficiently shielded by the cap from the high temperature of the combustion gases, so that as a result of reduced heating of the force-transmitting core, its rotationally asymmetrical deformation is also reduced.

In this connection another favorable result is the fact that the combustion pressure is not transmitted by the piston pin to the connecting rod, but directly to the head of the connecting rod, so that the stress on the piston pin is decreased, and it is required to accommodate only the centrifugal force exerted by the piston mass. As a result, the dimensions of the piston pin, which is necessarily a component rotationally asymmetrical to the cylinder's longitudinal axis, may be reduced. Therefore, the desired rotational symmetry is less disturbed.

Due to the elimination of piston rings and the use of ceramic material for the piston cap and cylinder liner, the unit may be operated at a substantially higher temperature. According to a preferred embodiment it is even advantageous for the cylinder liner to be surrounded by a layer thermally insulating it from the cylinder block, so that heat losses may be kept as small as possible.

In a preferred design the cylinder liner and/or the cap is made of a ceramic material containing graphite. The embedded graphite particles serve to lubricate the parts moving against one another and are capable of accomplishing this task even at high temperatures.

It is advantageous here for the piston head and/or the cylinder liner surface adjacent to the combustion chamber to be provided with a corrosion- and oxidation-resistant surface layer. This protects the areas of the piston head and cylinder liner that are most exposed to the hot combustion gases, and against which relative motion of other parts does not occur, from the hot combustion gases. In particular, it prevents the imbedded graphite particles from being destroyed.

The protective layer consists preferably of MoSi$_2$, Al$_2$O$_3$, or TaC. It may also consist of the ceramic base material itself. In a preferred embodiment the cap is made of silicium nitride; a thermally insulating, pressure-transmitting intermediate layer possibly placed between cap and force-transmitting core, of aluminum titanate or cordierite; the force-transmitting core, of steel; the cylinder liner, of silicium carbide or a silicium carbide-graphite composite; the band, of carbon fiber-reinforced carbon or carbon fiber-reinforced glass; and the thermally insulating layer, also of aluminum titanate or cordierite.

It is also advantageous for the bearing surface of the cylinder liner and/or the cap to be provided with a friction-reducing surface layer preferably consisting of TiN, TiC or W$_2$C.

In a design such as that described above, sealing with piston rings and cooling of the cylinder liner can be dispensed with; nevertheless, good sealing is achieved between piston and cylinder bearing surface, and the unit may be operated at extraordinarily high temperatures.

Because of the reduction in heat loss from the combustion chamber, a number of additional advantages are achieved, which are explained in the following:

Due to the decreased heat losses from the combustion chamber, redistribution of thermal energy to the exhaust gas occurs, which can be used in exhaust gas turbochargers and other downstream devices;

the hot exhaust gases facilitate downstream measures for reducing pollutants;

piston and cylinder lining take on early and also higher surface temperatures, resulting, especially in the instance of diesel motors, in less ignition delay and a shortened cold-starting phase;

reduced heat dissipation to the coolant results in smaller and lighter radiator designs.

A number of other advantages are attributable to reduced running play between piston and cylinder wall:

Impact forces and noise arising when the piston changes locating sides in the cylinder are reduced;

the formation of pollutants between piston shank and cylinder wall is reduced.

In addition, cylinder wear is reduced because of the employment of abrasion-resistant ceramic materials.

The following description of a preferred embodiment of the invention, in connection with the figure, provides further explanation. The figure shows a longitudinal sectional view of a piston-cylinder set according to the invention.

A cylinder liner 1 is inserted into a corresponding aperture in a cylinder block 2. The cylinder liner 1 is surrounded on its outer surface, essentially over its entire length, by a band 3, which consists of a fiber composite in which the fibers are preferably oriented circumferentially about the cylinder liner. In the embodiment represented, the thickness of band 3 decreases from its upper end to its lower end. The unit consisting of cylinder liner and band is surrounded by a layer 4, which thermally insulates the cylinder liner 1 from the cylinder block 2.

Supported movably in the cylinder liner 1 is a piston 5 which consists essentially of two parts: a rotationally symmetrical cap 6, and a rotationally asymmetrical force-transmitting core 7, which exhibits a throughhole 8 for accepting a piston pin 9. The force-transmitting core 7 is connected in a rotating manner by the piston pin 9 to a connecting rod 10, whose head 11 forms a spherical pressure pad 12 that contacts in two dimensions a complementary, central transmitting surface 13 in the force-transmitting core.

The cap 6 has a piston head 15 facing the combustion chamber 14 with a central depression 16 and a circular-cylindrical piston skirt 17, the outer surfaces of which lie in two-dimensional contact with the bearing surface of the cylinder liner 1. On the underside of the depression 16, the piston head is designed in its central area as a planar pressure pad 18 with an outer, annular shoulder 19 that lies opposite a corresponding central, planar pressure pad 20 with an outer, annular shoulder 21 on the upper side of the force-transmitting core 7. Between the two pressure pads 18 and 20 is an intermediate layer 22, the reinforced edge areas 23 of which fit into the annular shoulders 19 and 21 of the pressure pads 18 and 20, and therefore fix the intermediate layer parallel to the pressure pads.

The force-transmitting core 7 has in its lower area a circular cylindrical marginal section 24 with a radially outward-projecting flange 25. The lower skirt area 26 lies in two-dimensional contact with the cylindrical marginal section 24 of the force-transmitting core 7 and rests upon the flange 25. In this area cap 6 and force-transmitting core 7 are connected together, either flexibly or positively, or by an adhesive bond.

This juncture and the central force transmission surface over the intermediate layer 22 are the only points of contact between cap and force-transmitting core; otherwise, the two components are separated from each other by an annular cavity 27 surrounding the central force-transmitting point.

The forces generated by the combustion gases are transmitted through piston head 15, pressure pad 18, intermediate layer 22, transmitting surface 13, and pressure pad 12 directly to the head 11 of the connecting rod 10. The connecting rod, on the other hand, must accommodate only the centrifugal force exerted by the piston mass, and its dimensions may be reduced accordingly.

In a preferred embodiment the piston is composed of a ceramic material, preferably silicium nitride. Intermediate layer 22, which on one hand has the function of transmitting compressive forces from piston head to force-transmitting core, also serves to thermally insulate the cap from the force-transmitting core. This intermediate layer is preferably composed of aluminum titanate or cordierite.

Since the force-transmitting core is thermally shielded from the hot combustion gases by the cap, to which it is connected only in its lower, cooler region, the force-transmitting core can consist of steel.

The cylinder liner also preferably consists of a ceramic material, e.g., silicium carbide or a silicium carbide-graphite composite. These materials are particularly suited to withstand the temperatures arising in the invention design, in which no cooling is provided for the cylinder liner. At the cylinder head's top dead center position these temperatures can reach 700° C. This produces high requirements for resistance to high temperatures, resistance to thermal shock, and chemical resistance (oxidation stability), which can be met by using the ceramic materials described.

As a result of the piston design described, the piston undergoes essentially rotationally symmetrical deformation. Nearly constant radial expansion may be achieved over the height of the cap, despite the fact that a temperature difference exists over the height of the cap. The ceramic material employed has on the whole a lower thermal coefficient of expansion than the steel used to fabricate the force-transmitting core. Since the radial thermal expansion of the piston is determined in its upper area exclusively by the cap material, but in its lower area partially by the material of the force-transmitting core, approximately uniform radial thermal expansion of the piston is produced despite the temperature difference.

The radial thermal expansion behavior of the cylinder liner is matched to that of the piston by the band 3. Since the band exhibits less radial thermal expansion than the cylinder liner, it impedes the radial expansion of the cylinder liner and restricts it to a magnitude corresponding to the radial thermal expansion of the piston.

At the same time, the band compensates for the differential radial expansion of the cylinder liner that would occur along the cylinder axis as a result of differing temperatures.

This occurs in the embodiment illustrated as a result of the fact that the band is thicker in the upper, hot area of the cylinder liner than in its lower region.

Altogether, therefore, radial expansion is obtained that is uniform over the entire length of the cylinder liner and matched to that of the piston.

In addition, the band has the function of accommodating, through appropriate compressive prestressing of the ceramic cylinder liner, the forces that arise due to combustion pressure. Tensile stress on the cylinder liner is therefore avoided.

It is advantageous for the parts that experience relative displacement, i.e., the cylinder liner and the cap, to consist of a ceramic material that contains graphite, e.g., a silicium carbide-graphite composite. This guarantees lubrication between the friction partners, ensuring at least emergency lubrication in the event of failure of other lubricating measures.

In this connection it can be advantageous for the areas of the cylinder liner and the cap that are in direct contact with the hot combustion gases and against which relative displacement does not occur, i.e., the piston head and the upper edge of the cylinder liner, to be provided with a protective surface layer that prevents the imbedded graphite particles from being destroyed by the hot combustion gases. This protective layer may consist, e.g., of $MoSi_2$, $Al_2O_3$, or $TaC$. It is also possible for this protective layer to consist of the ceramic base material itself, that is, for the cylinder liner and piston head to contain no graphite particles imbedded in their boundary zones in the area in question.

The intermediate layer 22 and the thermally insulating layer 4 thermally separate the relatively resistant parts, i.e., the cylinder liner and the cap, from the heat-sensitive parts, i.e., the force-transmitting core, the piston pin, the connecting rod, and the cylinder block. For this reason they require good thermal insulating properties. In addition, however, the intermediate layer also has a support function, since it receives the gas pressure force and the piston's inertial force. The intermediate layer must therefore have high compression strength. The requirement for high compression strength and the requirement for good thermal insulation are fulfilled by ceramic materials, in particular, aluminum titanate or cordierite.

We claim:

1. Piston-cylinder set for reciprocating, internal combustion engines with a cylinder block having a combustion chamber, especially Otto and diesel engines, with a cylinder liner having an interior bearing surface and located in the cylinder block and a piston facing the combustion chamber supported movably therein along the length of said liner and along its own longitudinal axis, said piston containing a rotational bearing for a connecting rod employing a piston pin held within the piston and incorporating a spherical pressure pad in the piston that contacts two-dimensionally a corresponding spherical pressure pad on the connecting rod, characterized by a band (3) surrounding the cylinder liner (1) that consists of a fiber composite whose thermal expansion in a radial direction is less than that of the cylinder liner (1) to impede expansion of the latter, said band (3) varying in thickness over the length of the cylinder liner (1); the piston consisting of a cap (6), with a piston head (15) facing said combustion chamber (14) and an essentially cylindrical piston skirt (17) adjacent to said cylinder bearing surface, and a force-transmitting core (7) that contains said bearing for said piston pin (9) and said spherical pressure pad (13); a force-transmitting connection above the spherical pressure pad (13) and between piston head (15) and force-transmitting core (7), said force-transmitting connection being rotationally symmetrical to said piston's longitudinal axis; cap (6) being connected at a lower rim (26) of piston skirt located below said bearing (17) to force-transmitting core (7), no contact existing otherwise between cap (6) and force-transmitting core (7) except at the force-transmitting connection; and both cylinder liner (1) and cap (6) consisting of a ceramic material.

2. Piston-cylinder set according to claim 1, further characterized by having a layer (4) surrounding cylinder liner (1) and thermally insulating it from said cylinder block (2).

3. Piston-cylinder set according to claim 1, further characterized by cap (6) consisting of silicium nitride; a thermally insulating, pressure-transmitting intermediate layer (22) arranged between cap (6) and force-transmitting core (7); force-transmitting core (7), of steel; cylinder liner (1), of a material selected from the group consisting of silicium carbide and a silicium carbide-graphite composite; band (3), of a material selected from the group consisting of carbonfiber-reinforced carbon and carbonfiber-reinforced glass; and thermal insulating layer (4), said layer (22) and said insulating layer (4) being formed of a material selected from the group consisting of aluminum titanate and cordierite.

4. Piston-cylinder set according to claim 1, further characterized by at least one of said bearing surfaces of cylinder liner (1) and said cap (6) having a friction-reducing sliding layer.

5. Piston-cylinder set according to claim 4, further characterized by the sliding layer consisting of a material selected from the group consisting of TiN, TiC, and $W_2C$.

6. Piston-cylinder set according to claim 1 or 2, further characterized by at least one of said cylinder liner (1) and said cap (6) consisting of a ceramic material in which graphite is embedded.

7. Piston-cylinder set according to claim 6, further characterized by at least one of said piston head (15) and the edge of cylinder liner (1) adjacent to combustion chamber (14) having a corrosion- and oxidation-resistant protective surface layer.

8. Piston-cylinder set according to claim 7, further characterized by the protective surface layer consisting of a material selected from the group consisting of $MoSi_2$, $Al_2O_3$, or TaC, and the ceramic material itself.

* * * * *